United States Patent
Taxon

(10) Patent No.: US 6,941,901 B2
(45) Date of Patent: Sep. 13, 2005

(54) INJECTOR FOR AN INTERNAL COMBUSTION ENGINE FUELED WITH HYDROGEN GAS

(75) Inventor: Morse N Taxon, Oak Park, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 157 days.

(21) Appl. No.: 10/701,794

(22) Filed: Nov. 5, 2003

(65) Prior Publication Data

US 2004/0221821 A1 Nov. 11, 2004

Related U.S. Application Data

(60) Provisional application No. 60/469,231, filed on May 9, 2003.

(51) Int. Cl.[7] ............................................... F02B 47/00
(52) U.S. Cl. .............................. 123/25 E; 123/DIG. 12
(58) Field of Search ............................. 123/25 R, 25 C, 123/25 E, 25 F, DIG. 12

(56) References Cited

U.S. PATENT DOCUMENTS

| 3,983,882 A | 10/1976 | Billings ........................ 123/1 A |
| 4,167,919 A | 9/1979 | Woolley et al. ............... 123/1 A |
| 4,448,160 A * | 5/1984 | Vosper ......................... 123/297 |
| 4,508,064 A | 4/1985 | Watanabe ..................... 123/1 A |

* cited by examiner

Primary Examiner—Noah P. Kamen
(74) Attorney, Agent, or Firm—Ralph E. Smith

(57) ABSTRACT

An injector for hydrogen gas for use in an internal combustion engine, the injector comprising a mixing chamber communicating with a cylinder of the internal combustion engine via an injector tip, where a water input port and a hydrogen input port feed individually into the mixing chamber. The water-hydrogen mix in the mixing chamber when injected into the cylinder comprises water atomized by hydrogen gas in a stratified water-hydrogen-air mix.

12 Claims, 2 Drawing Sheets

INJECTOR FOR AN INTERNAL COMBUSTION ENGINE FUELED WITH HYDROGEN GAS

CROSS-REFERENCE TO RELATED APPLICATION

This application claims the benefit of Provisional Patent Application No. 60/469,231, filed May 9, 2003.

FIELD OF THE INVENTION

This invention relates to an injector for an internal combustion engine specifically designed to burn gaseous hydrogen as a fuel in a way which limits $NO_x$ emissions. More specifically, the present invention is directed to an injector for an internal combustion engine that is configured to mix and directly inject a charge of water and gaseous hydrogen into an engine combustion chamber after the intake valve has closed.

BACKGROUND OF THE INVENTION

The allure of hydrogen as a fuel flows from the most basic of chemical formulae: hydrogen plus oxygen equals water. This formula suggests that many of our vehicle related air quality problems could be eliminated simply by fueling conventional internal combustion engines with hydrogen gas.

Unfortunately, this is not the case. Gaseous hydrogen burns faster and hotter than hydrocarbon fuels. Air is 21% oxygen and 79% nitrogen with traces of a variety of other gases and thus hydrogen plus air yields a variety of other end products in addition to water, the most undesireable of which are nitrogen oxides (NOx). In addition, gaseous hydrogen displaces up to a third of the air in the cylinder of an internal combustion engine. This creates an additional complication. If a conventional internal combustion engine is fueled with hydrogen rather than gasoline, the hydrogen burns rapidly which results in unacceptable levels of NOx, and the release of significantly less energy.

A theoretical solution to this problem that is known in the art is fueling the internal combustion engine with water and hydrogen. The addition of water lowers both the rapidity of the combustion as well as its maximum temperature. This makes it possible to increase the power output and simultaneously reduce the high $NO_x$ emissions generally associated with hydrogen's fast heat release rate. Realizing this theory has proven difficult.

The specifics of one hydrogen/water fueling system is described in U.S. Pat. No. 3,983,882 to Billings ("the '882 patent). The '882 patent describes the use of a first stage carburetor for mixing $H_2$ and air directly connected to a second stage carburetor that meters water into the $H_2$-air mix. This second stage carburetor is connected to a conventional manifold from which the $H_2$-air-water mix is distributed to the cylinders (the '822 patent, col. 2, lines 16–35). Also described is the use of a first mechanical or electronic fuel injector to inject $H_2$ and a second injector to inject water into the cylinder head (the '822 patent, col. 4, lines 15–21).

U.S. Pat. No. 4,167,919 to Woolley, et al. ("the '919 patent"), describes a carburetor designed to mix hydrogen, gas, and air, and feed the mixture to an engine intake manifold (col. 2, lines 25–19). The '919 patent also describes the use of an injector to inject water into the hydrogen-air stream in place of the carburetor (col. 3, line 66 to col. 4, line 5; and FIG. 3).

Still another hydrogen/water fueling system is described in U.S. Pat. No. 4,508,064 to Watanabe ("the '064 patent").

The '064 patent describes a cylinder 1 having an inlet valve 4 and an exhaust valve 5; a first injector 6, and a second injector 7 port directly into a cylinder (col. 3, lines 25–35). Air flows into the cylinder 1 through the inlet valve which then closes; during the compression stroke the hydrogen gas and water are injected simultaneously or at staggered times and ignited by an ignition plug (col. 3, lines 39–46).

The suggested methods and apparatus of the '882 and the '919 patents solve the back fire and knocking problems that plagued early hydrogen fueled internal combustion engines. However, this can only be achieved by limiting the maximum output to about 60% of the output achieved from a comparably sized gasoline engine. (See, the '064 patent, col. 1, lines 39–59.) The '064 patent indicates that the problems encountered in the '882 and '919 patents are overcome by separately injecting hydrogen gas and liquid water via separate injectors so that the mixing, vaporization of the water, combustion of the hydrogen, etc. all take place in the combustion chamber (col. 2, lines 21–45).

While the '882, '919, and '064 patents all reduce NOx emissions, none of the metering systems described are accurate enough to reduce NOx emissions to a level that would meet current US standards and simultaneously produce maximum power. (Note, current US NOx emission standards are roughly $\frac{1}{10}$ of the current allowable levels in Europe.) Further, all of these prior art systems are too large, require too much space, and cost too much.

SUMMARY OF THE INVENTION

One object of the present invention is an injector for an internal combustion engine fueled with hydrogen gas that reduces NOx to acceptable levels.

Another object of the invention is to facilitate full engine power capability by allowing near stoichiometric ratios with a full intake air charge.

Still another object of the invention is an injector for and internal combustion engine fueled with hydrogen gas that is small, efficient, inexpensive, and durable.

These and other objects of the invention are satisfied by an injector comprising a mixing chamber, and separate water input and hydrogen input ports each feeding into the mixing chamber. The mixing chamber communicates with an engine cylinder via an injector tip. Solenoids or variable solenoids under control of a main or remote processing unit meter the hydrogen and water into the mixing chamber that when injected into the cylinder results in atomized water and hydrogen gas in a stratified water-hydrogen-air mix. Hydrogen input pressure, water input pressure, injection pressure and frequency, as well as the amount of air in the cylinder are controlled to optimize maximum performance and fuel efficiency depending on the engine state.

BRIEF DESCRIPTION OF THE DRAWINGS

FIG. 3 is a perspective cutaway illustrating the positioning of a hydrogen fuel tank used in conjunction with the present invention.

DETAILED DESCRIPTION

Historically, the maximum power output from a hydrogen fueled internal combustion engine is significantly lower than the power output of a similarly sized gasoline fueled engine.

One reason for this is that gaseous hydrogen displaces up to one third of the air in the engine cylinder thereby reducing the amount of combustion energy released. Further, operating an engine on hydrogen at close to stoichiometric ratios is difficult due to its tendency to pre-ignite at low temperatures. Finally hydrogen burns very quickly resulting in high temperatures and NOx formation. The unique injector of the present invention avoids the problems of the prior art by pre-mixing hydrogen and water prior to injecting it directly into an engine cylinder after the intake valve is closed. This allows a full charge of air to be inducted. When the hydrogen-water mixture flows out of the injector, the water is finely atomized which serves to better cool and dilute the charge compared to the prior art. In addition, this finely atomized water adsorbs some of the heat of combustion which reduces temperature and NOx. Finally, as the atomized water vaporizes, it expands, enhancing mean effective pressure (MEP) and thus power.

Figure 1:
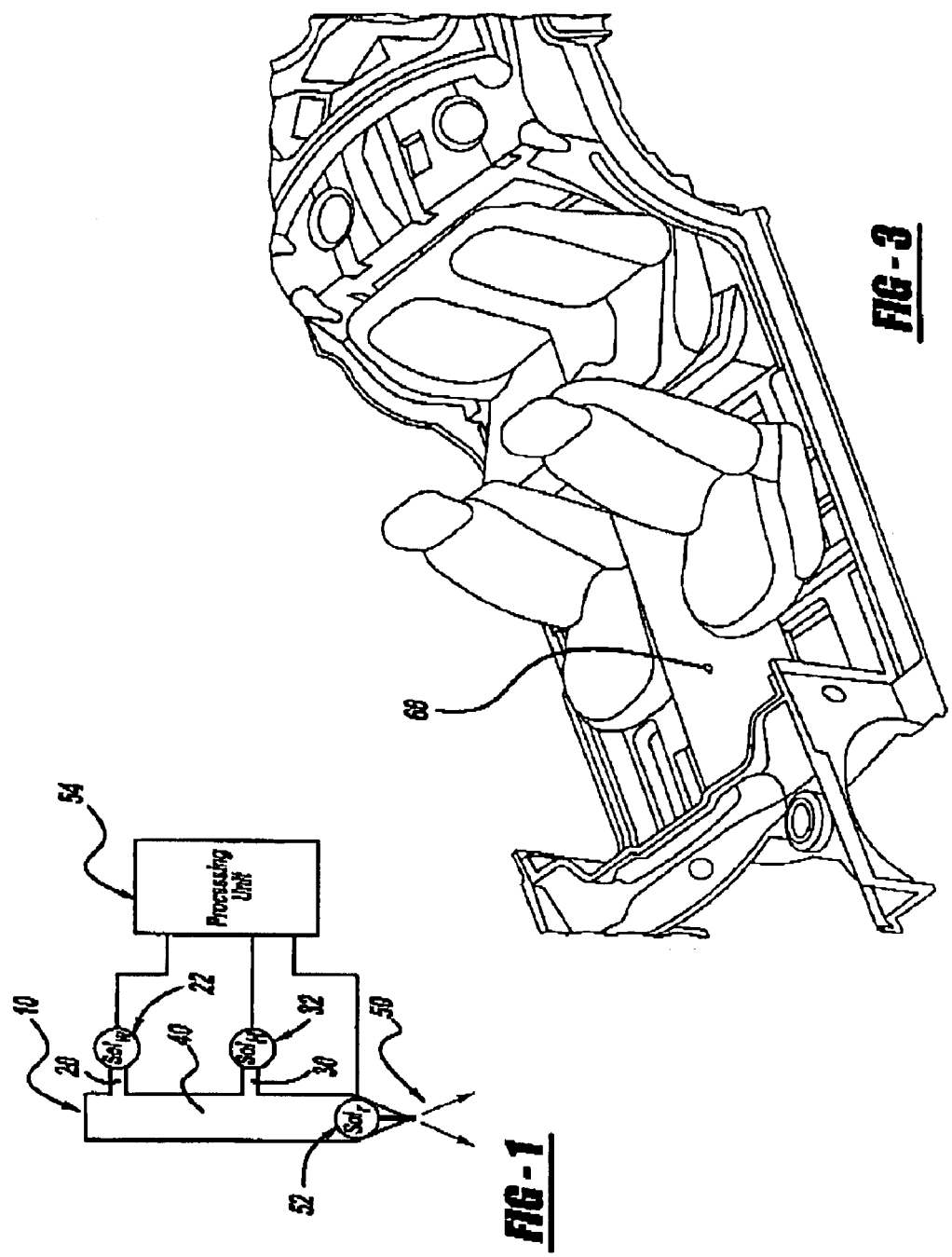
FIG. 1 is a schematic view of an injector according to the present invention.

FIG. 1 illustrates an injector 10 according to the present invention. The injector 10 comprises a water input port 20, a hydrogen input port 30, a mixing chain 40, and an injector tip 50. The water input port 20, hydrogen input port 30, and injector tip 50 may also comprise individually controllable solenoids or variable solanoids (denoted respectively as elements 22, 32, and 52 in FIG. 1) under control of a main processing unit or a remote processing unit. Hydrogen input pressure, water input pressure, injection pressure, and frequency (as well as the charge of air in the cylinder) can then be optimized to deliver maximum performance and fuel efficiency.

In particular, by permitting the pressure and quantity of water and hydrogen input into the mixing chamber, an injector of the present invention permits optimized mixing and atomization of the water by the hydrogen gas. By controlling the water-hydrogen-air mix concentrations and by coordinating the injection of the mix with the operation of the cylinder valves, stratified fuel concentrations are established in the cylinder to assure an optimized burn, maximized power, and minimized NOx production. Since the described invention in conjunction with a processor and appropriate sensors permits introducing mixture and stratification variations in real time, significantly improved overall performance can be achieved.

While it is possible to use one or more injectors 10 with a throttle body, it is believed that greatest efficiency can be achieved using an individual injector 10 for each cylinder of the engine. It is also preferred that each injector incorporate a water input solenoid and a hydrogen input solenoid at the respective input ports for individually metering the amount of water and hydrogen through the water input port 20 and the hydrogen input port 30 into the mixing chamber 40.

More specifically, a preferred configuration of the present invention employs a central processing unit (CPU) operatively coupled to control the operation of the water input solenoid, the hydrogen input solenoid, and the injector tip solenoid. Without wishing to be bound by theory, the inventor believes that optimum engine performance can be achieved if the CPU is programmed to control the operation of the water and hydrogen input solenoids to meter to quantities of water and hydrogen into the mixing chamber; and to control the injection tip solenoid to inject the water-hydrogen mix after the cylinder valve has closed to produce a finely atomized stratified water-hydrogen-air mix in the engine cylinder.

An alternative configuration of the present invention is an injector (not illustrated) configured with only two solenoids where a water input solenoid controls injection of water into the mixing chamber and an injection tip solenoid controls the injection of the mixing chamber into an engine cylinder. There is no hydrogen input solenoid. Rather, the hydrogen input port is always open to the hydrogen system pressure, and the quantity of hydrogen injected into the mixing chamber (and consequently into the engine cylinder) is controlled by the amount of time the injection tip solenoid remains open.

Achieving an optimized water-hydrogen mix and stratifying this mix with air in each cylinder requires constant monitoring of a variety of engine parameters and adjustment of the mix and the stratification based on a variety of factors such as ambient temperature, engine temperature, engine speed, engine load, acceleration of deceleration rate, etc. As is known in the art, considering such operating parameters is best accomplished through the use of real time sensor(s) configured to monitor and relay data regarding engine and vehicle state to the CPU.

Overall, the injector of the invention is simple and inexpensive to manufacture. It can be configured to contain water input, hydrogen input, and injector output solenoids, or the water and hydrogen solenoids may be located remotely. In addition, the present invention atomizes the water with hydrogen. This occurs as high-pressure hydrogen forces the water over shear geometries in the injector and between the valve (pintle) and valve seat of the injector as the water-hydrogen mix exits the injector. This results in finer atomization and a premixing of the water-hydrogen as it is injected into the cylinder. Depending on the injection timing and engine operating conditions, the injector 10 can be used to achieve either a stratified charge stratified of the water-hydrogen-air or a homogeneous mixture. Further, the present invention requires only a minimum of space on the engine surface.

Another aspect of the present invention is the use of water produced from burning hydrogen fuel as the water source for the injector. This eliminates the necessity of constantly adding water to a reservoir, and thus eliminates a potential source of contaminants that could affect the overall efficiency of the injection system.

Figure 2:
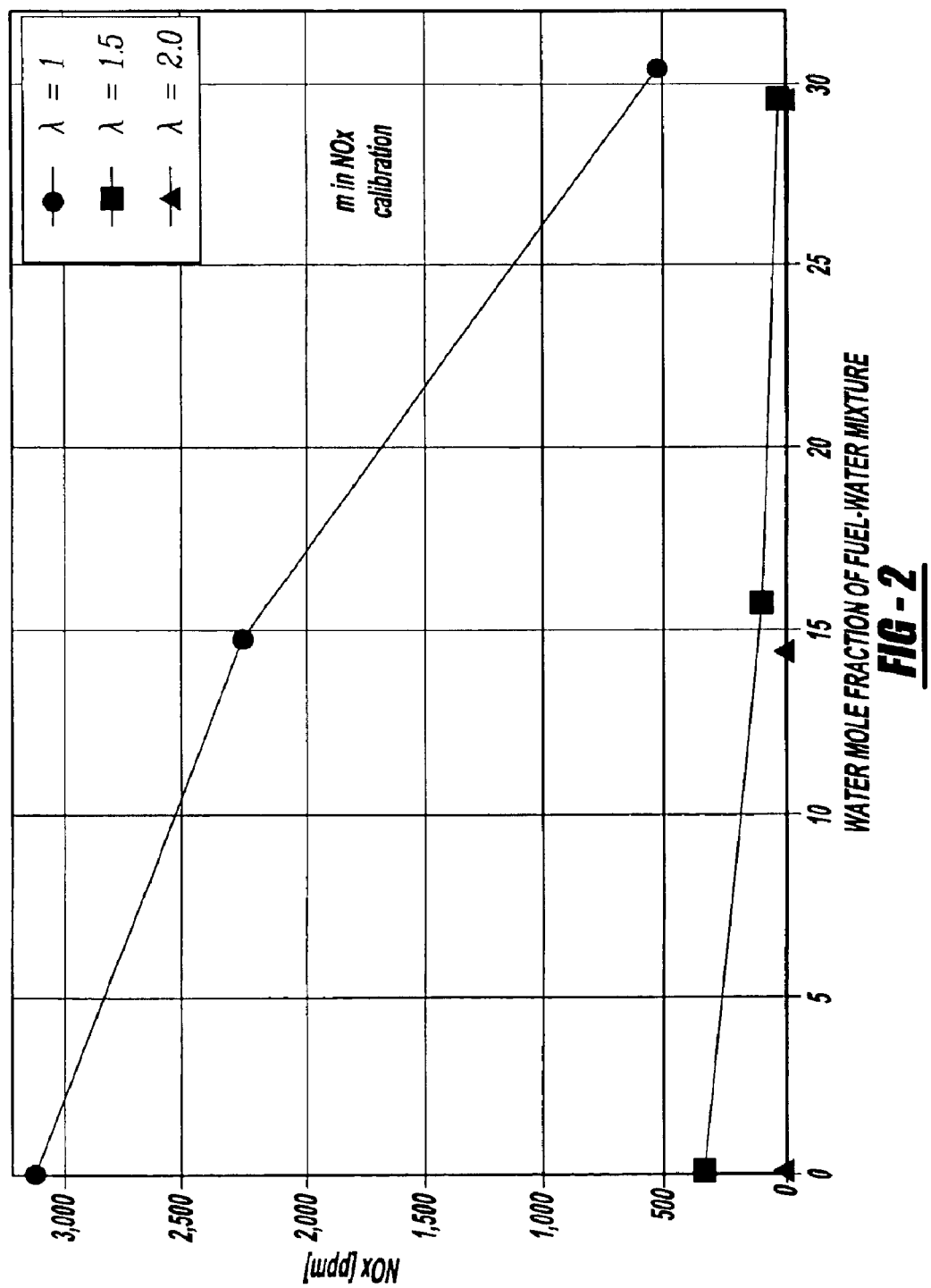
FIG. 2 illustrates the reduction of NOx levels achievable using an engine configured with the present invention.

It is known in the art that NOx production is minimized when the mixture in the cylinder is lean and better power is produced as the mixture is enriched. For a variety of reasons, it is undesirable to simply run the engine on a rich mixture using continuous water injection. In FIG. 2, $\lambda$ is the normalized air fuel ratio, the x axis is the water-mole fraction and the y is NOx ppm. In an engine using injectors according to the present invention, the NOx level of 500 ppm can be achieved when $\lambda=1$ (i.e. at stoichiometric ratios).

FIG. 3 illustrates a high pressure hydrogen fuel tank 60 positioned in the floor pan tunnel, where the tank is a carbon fiber or equivalent wound tank capable of containing about 6 kg of hydrogen (the equivalent of six gallons of gasoline) at 10,000 psi. Thus, a vehicle with an engine using injector (s) according to the present invention configured to have a fuel economy of 50 mpgge (miles per gallon gasoline equivalent or 50 miles per kg of $H_2$) would have a range of 300 miles using the illustrated tank. Obviously, if the engine is configured to have greater fuel economy, the range of the vehicle will be greater than 300 miles. Such tanks are described in detail in co-pending application number 10/695,338 filed Oct. 22, 2003 the contents of which are specifically incorporated herein by reference.

It is to be understood that although the invention has been described with particular reference to specific embodiments, the forms of the invention shown and described are to be taken as a non-limiting embodiment and various changes and modifications may be made to the invention without departing from its spirit and scope.

What is claimed is:

1. An injector for hydrogen gas for use in an internal combustion engine, said injector comprising:
   a mixing chamber communicating with a cylinder of said internal combustion engine via an injector tip;
   a water input port feeding into said mixing chamber;
   a water input solenoid incorporated to meter water into said mixing chamber at said water input port;
   a hydrogen input port feeding into said mixing chamber;
   a hydrogen input solenoid incorporated to meter hydrogen into said mixing chamber at said hydrogen input port, and
   an injector tip solenoid incorporated to control injection of said mixing chamber contents into said cylinder.

2. The injector of claim 1, further comprising:
   a central processing unit operatively coupled to control the operation of said water input solenoid, said hydrogen input solenoid, and said injector solenoid.

3. The injector of claim 2, where said central processing unit controls the operation of said water input solenoid and said hydrogen input solenoid to produce a water-hydrogen mix comprising water atomized by hydrogen in said mixing chamber.

4. The injector of claim 2, where said central processing unit coordinates operation of said water input solenoid, said hydrogen input solenoid, said injection tip solenoid, with operation of said internal combustion engine to produce a stratified water-hydrogen-air mix in said cylinder.

5. The injector of claim 4, further comprising:
   at least one real time sensor configured to monitor said internal combustion engine and relay engine state information to said central processing unit.

6. The injector of claim 5, where said stratified water-hydrogen-air mix is optimized by said central processing unit based on said engine state information.

7. An injector for hydrogen gas for use in an internal combustion engine, said injector comprising:
   a mixing chamber communicating with a cylinder of said internal combustion engine via an injector tip incorporating an injection tip solenoid;
   a water input port incorporating a water input solenoid feeding into said mixing chamber; and
   a hydrogen input port feeding into said mixing chamber.

8. The injector of claim 7, further comprising:
   a central processing unit operatively coupled to control the operation of said water input solenoid, and said injector tip solenoid.

9. The injector of claim 8, where said central processing unit controls the operation of said water input solenoid to produce a water-hydrogen mix comprising water atomized by hydrogen in said mixing chamber.

10. The injector of claim 8, where said central processing unit coordinates operation of said water input solenoid and said injection tip solenoid, with operation of said internal combustion engine to produce a stratified water-hydrogen-air mix in said cylinder.

11. The injector of claim 10, further comprising:
    at least one real time sensor configured to monitor said internal combustion engine and relay engine state information to said central processing unit.

12. The injector of claim 11, where said stratified water-hydrogen-air mix is optimized by said central processing unit based on said engine state information.

* * * * *